(12) United States Patent
Ichihara

(10) Patent No.: US 9,608,494 B2
(45) Date of Patent: Mar. 28, 2017

(54) ROTATING ELECTRICAL MACHINE WITH BRUSH HOLDER

(75) Inventor: Hayami Ichihara, Chita-gun (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 685 days.

(21) Appl. No.: 13/881,092

(22) PCT Filed: Dec. 2, 2011

(86) PCT No.: PCT/JP2011/077944
§ 371 (c)(1),
(2), (4) Date: Apr. 23, 2013

(87) PCT Pub. No.: WO2012/086389
PCT Pub. Date: Jun. 28, 2012

(65) Prior Publication Data
US 2013/0264900 A1  Oct. 10, 2013

(30) Foreign Application Priority Data

Dec. 24, 2010 (JP) .................................. 2010-288342

(51) Int. Cl.
*H02K 13/10* (2006.01)
*H01R 39/36* (2006.01)
(Continued)

(52) U.S. Cl.
CPC ............. *H02K 5/148* (2013.01); *H02K 5/225* (2013.01); *H02K 11/02* (2013.01); *H02K 11/026* (2013.01); *H01R 39/36* (2013.01)

(58) Field of Classification Search
CPC ........ H02K 5/148; H02K 5/225; H02K 13/10; H01R 39/36
(Continued)

(56) References Cited

U.S. PATENT DOCUMENTS 5,066,878 A * 11/1991 Sekine ...................... B60S 1/08
310/40 MM
5,886,448 A * 3/1999 Yoshida ................. H02K 5/225
310/239
(Continued)

FOREIGN PATENT DOCUMENTS

JP          0386052 A    4/1991
JP          0629379 U    4/1994
(Continued)

OTHER PUBLICATIONS

Japanese Office Action issued Mar. 13, 2014 in Japanese Patent Application No. 2010-288342.

*Primary Examiner* — John K Kim
(74) *Attorney, Agent, or Firm* — Sughrue Mion, PLLC

(57) ABSTRACT

An opening of a yoke provided to an electric motor is closed by a brush holder of an electricity supply unit. A pair of electricity supply terminals connected to respective brushes is fixed on the brush holder by outsert molding. A brush-side fixing pillar is inserted into a caulking hole piercing through a pigtail connecting portion of each electricity supply terminal, an input-side fixing pillar is inserted into a fixing hole piercing through an input-side connecting portion, and then the brush-side fixing pillar and the input-side fixing pillar are thermally caulked, whereby each electricity supply terminal is fixed on the brush holder. Each input-side fixing pillar and the corresponding brush-side fixing pillar, provided on the brush holder, are spaced away from each other by a predetermined distance so that a first terminal, a second terminal and a choke coil connected therebetween is attachable in place of the electricity supply terminal.

2 Claims, 9 Drawing Sheets

(51) Int. Cl.
*H02K 5/14* (2006.01)
*H02K 11/026* (2016.01)
*H02K 11/02* (2016.01)
*H02K 5/22* (2006.01)

(58) Field of Classification Search
USPC .................................................. 310/239, 249
IPC ................................. H02K 13/10; H01R 39/36
See application file for complete search history.

(56) References Cited

U.S. PATENT DOCUMENTS

| | | | |
|---|---|---|---|
| 5,889,378 A | 3/1999 | Hayashi | |
| 6,011,341 A * | 1/2000 | Toya | B60T 8/4022 |
| | | | 310/239 |
| 6,515,399 B1 * | 2/2003 | Lauf | H02K 5/145 |
| | | | 310/238 |
| 7,928,628 B2 * | 4/2011 | Honda | H01R 11/05 |
| | | | 310/219 |
| 2008/0197723 A1 * | 8/2008 | Ichihara | H02K 11/026 |
| | | | 310/51 |
| 2008/0284272 A1 * | 11/2008 | Honda | H01R 11/05 |
| | | | 310/239 |
| 2009/0206694 A1 * | 8/2009 | Kamiya | H01R 39/383 |
| | | | 310/239 |
| 2009/0255186 A1 | 10/2009 | Uchimura | |
| 2013/0264900 A1 * | 10/2013 | Ichihara | H02K 5/148 |
| | | | 310/72 |

FOREIGN PATENT DOCUMENTS

| | | |
|---|---|---|
| JP | 10-86831 A | 4/1998 |
| JP | 10327566 A | 12/1998 |
| JP | 1141854 A | 2/1999 |
| JP | 2000287416 A | 10/2000 |
| JP | 2001-268842 A | 9/2001 |
| JP | 2007267448 A | 10/2007 |
| JP | 2008-61430 A | 3/2008 |
| JP | 2009-195030 A | 8/2009 |
| JP | 2009-268207 A | 11/2009 |
| JP | 2010-183821 A | 8/2010 |

* cited by examiner

ROTATING ELECTRICAL MACHINE WITH BRUSH HOLDER

CROSS REFERENCE TO RELATED APPLICATIONS

This application is a National Stage of International Application No. PCT/JP2011/077944 filed Dec. 2, 2011, claiming priority based on Japanese Patent Application No. 2010-288342 filed Dec. 24, 2010, the contents of all of which are incorporated herein by reference in their entirety.

TECHNICAL FIELD

This invention relates to a rotating electrical machine having a brush slidably contacting a commutator.

BACKGROUND OF THE TECHNOLOGY

For example, the patent document 1 discloses a known technology relating to a motor wherein a terminal, which is insert-molded at a case having a built-in circuit board, is fitted to a brush retainer. According to the known technology disclosed in the patent document 1, each component such as the terminal, a switching element, a condenser and a relay is connected to a wiring pattern of the brush retainer in order to downsize the case and reduce radiation noise.

Furthermore, for example, the patent document 2 discloses another known technology relating to a motor wherein a choke coil for preventing the emission of electromagnetic noise, a condenser and a terminal are preliminarily unitized as a circuit unit, and the circuit unit is fixed on a gear housing, whereby assembling of the above mentioned components is facilitated.

PRIOR ART DOCUMENT

Patent Document

Patent Document 1: JP10-86831A
Patent Document 2: JP2001-268842A

DISCLOSURE OF INVENTION

Problems to be Solved

Generally, a motor having a brush is attached with a noise absorbing element such as a condenser (capacitance) or a choke coil (an inductor) at an inside or outside of the motor in order to reduce noise generated by the motor.

Hence, in the case that the noise absorbing element is provided at the inside of the motor, consideration needs to be given to, for example, assurance of a space for the noise absorbing element, a shape of a terminal supplying electricity to the brush, and a structure of a holder holding the noise absorbing element and the terminal.

Specifically, in the case that the designs of the motor with the noise absorbing element and the motor without the noise absorbing element are considered for the congruent motor, plural specific molds for producing the holder and the like and plural other specific components need to be prepared depending on the design with or without the noise absorbing element. As a result, the manufacturing cost and the size of the motor is increased.

The present invention was made in consideration with the above drawbacks and the object of the invention is to provide a rotating electrical machine whose size is small and manufacturing cost is low regardless of the presence or absence of a noise absorbing element.

Means for Solving the Problem

According to an aspect of the disclosure, a rotating electrical machine includes a housing whose one end is opened, a brush holder attached on the housing so as to close an opening of the housing, a rotor shaft attached to the rotating electrical machine while allowing the rotor shaft to be rotatable relative to the housing and the brush holder, a commutator provided on an outer circumferential surface of the rotor shaft, a pair of brushes attached on the brush holder while allowing the brushes to slidably contact the commutator, and a pair of terminal structures each of whose one end is fixed on the brush holder and the other end is connected to the corresponding brush, and supplying electricity to the brushes when an electric current is input to the terminal structures, wherein at least one of the pair of terminal structures is formed with either a first structure whose one end extends to the other end thereof to form an integral part, or a second structure including a first terminal arranged at the one end-side, a second terminal arranged at the other end-side, and a noise absorbing element connected between the first terminal and the second terminal, the brush holder is formed with a first fixing portion for fixing the one end portion of at least one of the terminal structures and a second fixing portion for fixing the other end portion of the selected terminal structure, the first fixing portion and the second fixing portion are spaced away from each other by a predetermined distance, and a terminal holding portion holding the terminal structure extends in a rotation axis direction of the rotor shaft from an element attachment portion on which the first fixing portion and the second fixing portion are formed, and wherein either one of the first structure and the second structure is fixed to the brush holder.

BRIEF DESCRIPTION OF ATTACHED DRAWINGS

THE BEST MODE EMBODIMENT OF THE INVENTION

First Embodiment

A first embodiment of an electric motor 1 according to the invention will be explained with reference to FIG. 1 to FIG.

4. The electric motor 1 of the first embodiment is configured so that an electricity supply unit 4 does not include a noise absorbing element. A rotation axis direction or an axial direction mentioned in the explanation corresponds to a direction along a rotation axis C of the electric motor 1, in other words, a left-and-right direction in FIG. 1, unless otherwise specified.

The electric motor 1 (which corresponds to a rotating electrical machine) according to the first embodiment is a continuous current motor (DC motor) that drives a hydraulic pump (not illustrated) however, the present invention is not limited to this application.

Figure 1:
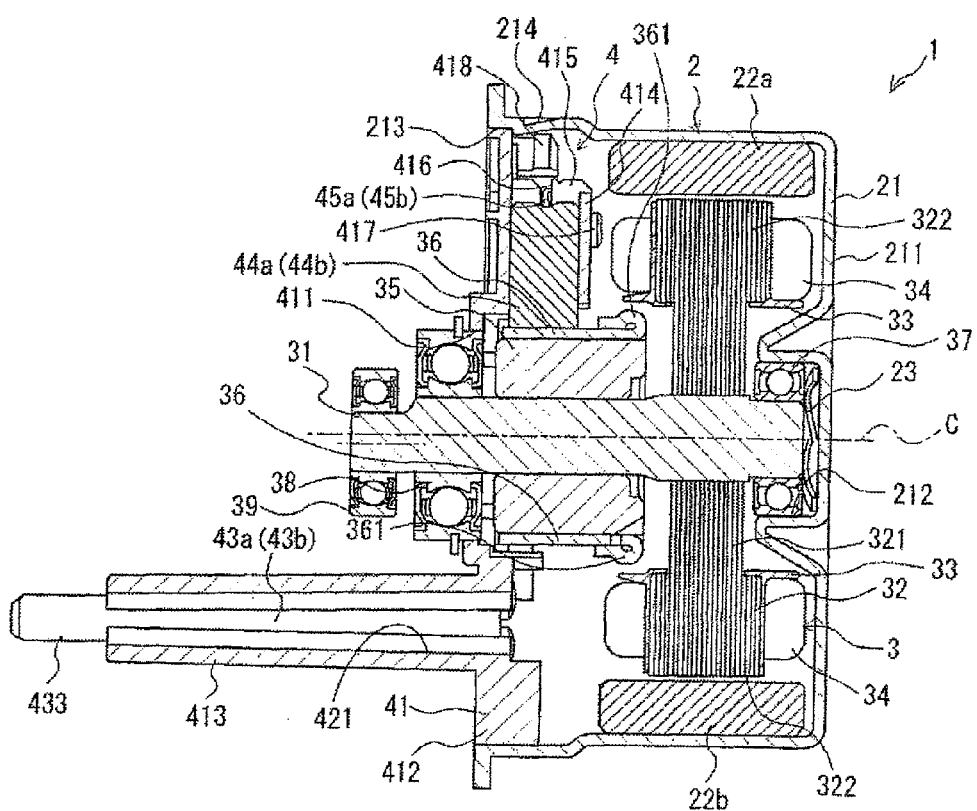
FIG. 1 is a cross sectional view illustrating an electric motor according to a first embodiment of the invention taken along a rotation axis direction.

As shown in FIG. 1, a yoke 21 (which corresponds to a housing) configuring a stator 2 is formed of, for example, a rolled steel plate, and a pair of field poles 22a and 22b is firmly fixed on an inner circumferential surface of the yoke 21. The field poles 22a and 22b are formed by permanent magnets, respectively, and are arranged on the circumference about the rotation axis C. The field poles 22a and 22b are arranged at positions opposing to each other relative to the rotation axis C (so as to be point symmetric). The field pole 22a is formed so that an inner circumferential portion thereof becomes the north pole, and an outer circumferential portion thereof becomes the south pole. On the other hand, the field pole 22b is formed so that an inner circumferential potion thereof becomes the south pole, and an outer circumferential portion thereof becomes the north pole.

The yoke 21 is formed in a substantially cup shape, more specifically, an axially right end portion of the yoke 21 in FIG. 1 is closed by a bottom wall 211. A recessed portion 212 recessed to the right in the axial direction is formed at a central portion of the bottom wall 211 in a radial direction. A right end of a rotation shaft 31 (which corresponds to a rotor shaft) of a rotor 3 is attached to the recessed portion 212 via a shaft bearing 37 while allowing the rotation shaft 31 to be rotatable about the rotation axis C.

A left end portion of the yoke 21 is opened to form an opening 213 on which the electricity supply unit 4 is attached. A brush holder 41 of the electricity supply unit 4 is fit into the opening 213, and then a calking portion 214 formed at an outer circumferential surface of the yoke 21 is made to protrude in a radially inward direction, whereby the brush holder 41 is firmly fixed on the yoke 21 and closes the opening 213. A bearing bore 411 is formed at a radially center portion of the brush holder 41, and a left portion of the rotation shaft 31 is rotatably supported by the bearing bore 411 via a bearing 38.

The left end portion of the rotation shaft 31 engages with an oscillating member of the hydraulic pump via a bearing 39. The left end portion of the rotation shaft 31 is eccentric relative to the rotation axis C, so that the oscillating member oscillates in response to rotation of the rotation shaft 31. A plate spring 23 is provided between the bottom wall 211 of the yoke 21 and the right end portion of the rotation shaft 31, so that the rotation shaft 31 is biased towards the hydraulic pump by the plate spring 23.

A rotor core 32 formed of plural magnetic steel plates being laminated is firmly fixed on an outer circumferential surface of the rotation shaft 31. The rotor core 32 includes a connecting portion 321 fitted on the rotation shaft 31, and plural magnetic pole portions 322 formed radially outward of the connecting portion 321 and facing the field poles 22a and 22b. Each of the magnetic pole portions 322 is formed to be thicker than the connecting portion 321 in the axial direction. An insulator 33 is attached so as to surround each of the magnetic pole portions 322. A rotor coil 34 is wound around each of the magnetic pole portions 322 via the insulator 33, whereby the rotor coil 34 is insulated from the corresponding magnetic pole portion 322 by the insulator 33.

As shown in FIG. 1, a commutator 35 is attached on the outer circumferential surface of the rotation shaft 31. Plural segments 36 of the commutator 35 (the configuration including the commutator 35 and the segments 36 corresponds to the commutator) are formed on an outer circumferential surface of the commutator 35. A folded portion 361 in a curled shape is formed at an axially end portion of each of the segments 36, and each segment 36 contacts an end portion of the aforementioned rotor coil 34 at the folded portion 361 (a point of connection is not illustrated).

The electricity supply unit 4 will be explained below. The electricity supply unit 4 is formed to be symmetric about the up-and-down direction in FIG. 4 as a center axis. As illustrated in FIG. 1, the brush holder 41 is formed in one piece by a synthetic resin material, and includes a substantially disc-shaped element attachment portion 412 and a terminal holding potion 413. While the brush holder 41 is attached to the yoke 21, the element attachment portion 412 extends in a flat plate shape in the rotation axis direction, and the terminal holding portion 413 extends in the rotation axis direction from the element attachment portion 412. As is the case with the electricity supply unit 4, the brush holder 41 is also formed to be left-right symmetric in FIG. 2. The aforementioned terminal holding portion 413 is formed at each of left and right center locations of the brush holder 41.

A pair of case portions 414 is formed on an upper surface (a surface in the right side in FIG. 1) of the element attachment portion 412 so as to surround the bearing bore 411. Each case portion 414 is formed in a box shape hollowing in the radial direction, and a slit 416 is provided at an outer end portion of a case side surface 415 of the case portion 414 (see FIG. 1).

Figure 2:
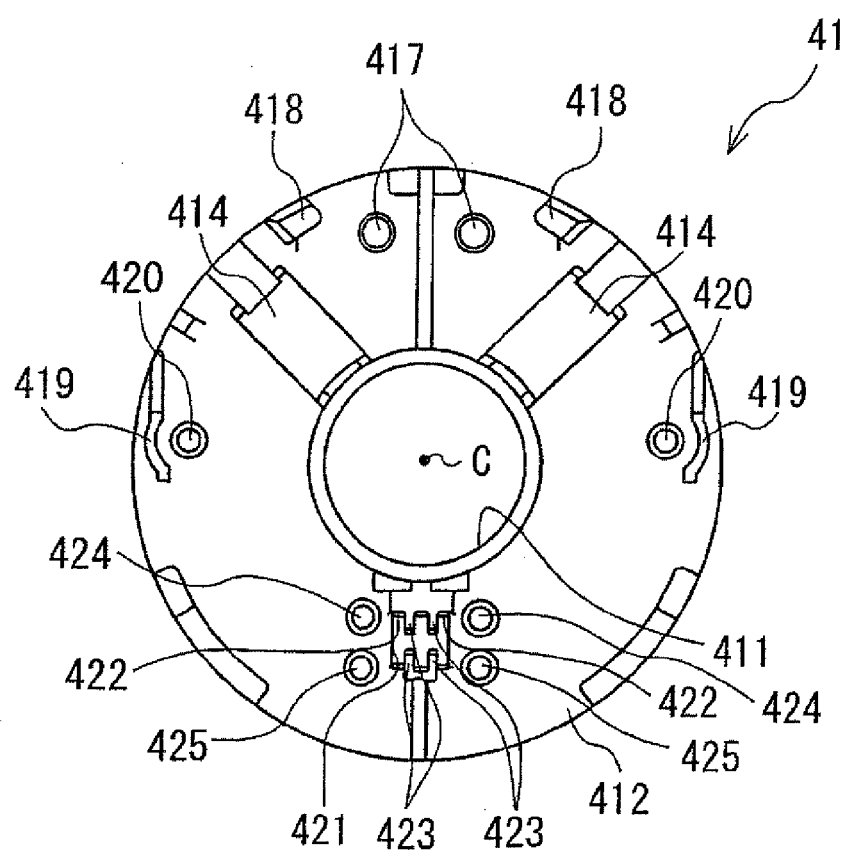
FIG. 2 is a plan view of a brush holder illustrated in FIG. 1.

A column-shaped holding shaft 417 is provided to stand in the vicinity of each case portion 414 (see FIG. 2). A spring bearing portion 418 projects between each case portions 414 and each holding shaft 417.

A pair of guide walls 419 is provided to stand at an outer circumferential portion of the brush holder 41 (the left and right end portions in FIG. 2). A brush-side fixing pillar 420 (which corresponds to a second fixing portion) in a column-shape projects at a location radially inwardly of each guide wall 419. The brush-side fixing pillars 420 fix the connection of electricity supply terminals 43a and 43b to respective brushes 44a and 44b, which will be explained below.

The brush holder 41 is formed with a terminal insertion bore 421 which is located below the bearing bore 411 in FIG. 2. The terminal insertion bore 421 extends through the aforementioned terminal holding portion 413 in the longitudinal direction and opens at an end portion of the terminal holding portion 413 (see FIG. 1). As shown in FIG. 2, the terminal insertion bore 421 is formed so that the cross section thereof has a shape where a pair of insertion portions 422 formed at respective left and right end portions is separated by four partition walls 423.

A pair of input-side fixing pillars 424 and 425 (which corresponds to a first fixing portion) is formed at the left and right of the terminal insertion bore 421 and arranged alongside each insertion portion 422. Each of the input-side fixing pillars 424 and 425 is formed in a column shape and projects from the brush holder 41. The pair of input-side fixing pillars 424 and 425 fixes an electric current input-side of each of the electricity supply terminals 43a and 43b. As shown in FIG. 2, the pair of the input-side fixing pillars 424 and 425 at the left side and the corresponding brush-side fixing pillar 420 are spaced away from each other by a predetermined distance, and similarly, the pair of the input-side fixing pillars 424 and 425 at the right side and the corresponding brush-side fixing pillar 420 are spaced away from each other by the predetermined distance.

Figure 3:
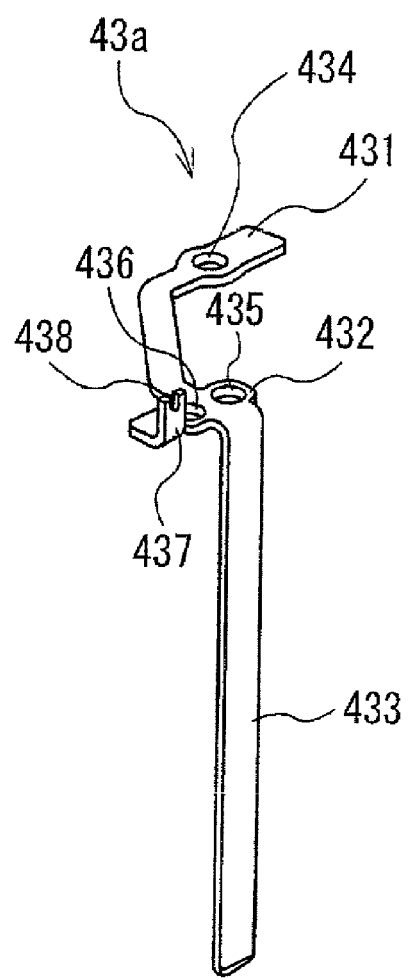
FIG. 3 is a perspective view of one of electricity supply terminals according to the first embodiment.

The electricity supply terminals 43a and 43b will be described below with reference to FIG. 3. Each of the left and right electricity supply terminals 43a and 43b corresponds to a terminal structure and also a first structure. In this embodiment, the pair of electricity supply terminals 43a and 43b is formed to be bilaterally symmetric (see FIG. 4), therefore the electricity supply terminal 43a provided at the left side will be explained. Additionally, the upper side in FIG. 3 is referred to as the upper side of the electricity supply terminal 43a for convenience.

The electricity supply terminal 43a is formed in one piece by, for example, a metallic material having conductivity, such as brass and the like. The electricity supply terminal 43a includes a pigtail connecting portion 431 (which corresponds to the other end portion of the terminal structure), an input-side fixing portion 432 (which corresponds to one end portion of the terminal structure) connected to the pigtail connecting portion 431, and a contact portion 433 connected to the input-side fixing portion 432 and extending in the vertical direction, which are formed in the continuous one piece.

The pigtail connecting portion 431 and the input-side fixing portion 432 are formed in a continuous flat plate shape. A single caulking hole 434 pierces through the pigtail connecting portion 431, and a pair of fixing holes 435 and 436 pierces through the input-side fixing portion 432. The caulking hole 434 on the one hand and the fixing holes 435 and 436 on the other hand are spaced away from each other by a predetermined distance corresponding to the distance between the pair of input-side fixing pillars 424 and 425 on the one hand and the corresponding brush-side fixing pillar 420 on the other.

The input-side fixing portion 432 is integrally formed with a capacitance connecting portion 437 (which corresponds to an attachment portion for a condenser). The capacitance connecting portion 437 is vent to be vertical relative to the input-side fixing portion 432, and is provided with a cut out 438 at a top portion thereof. The capacitance connecting portion 437 may be integrally formed at the pigtail connecting portion 431.

Figure 4:
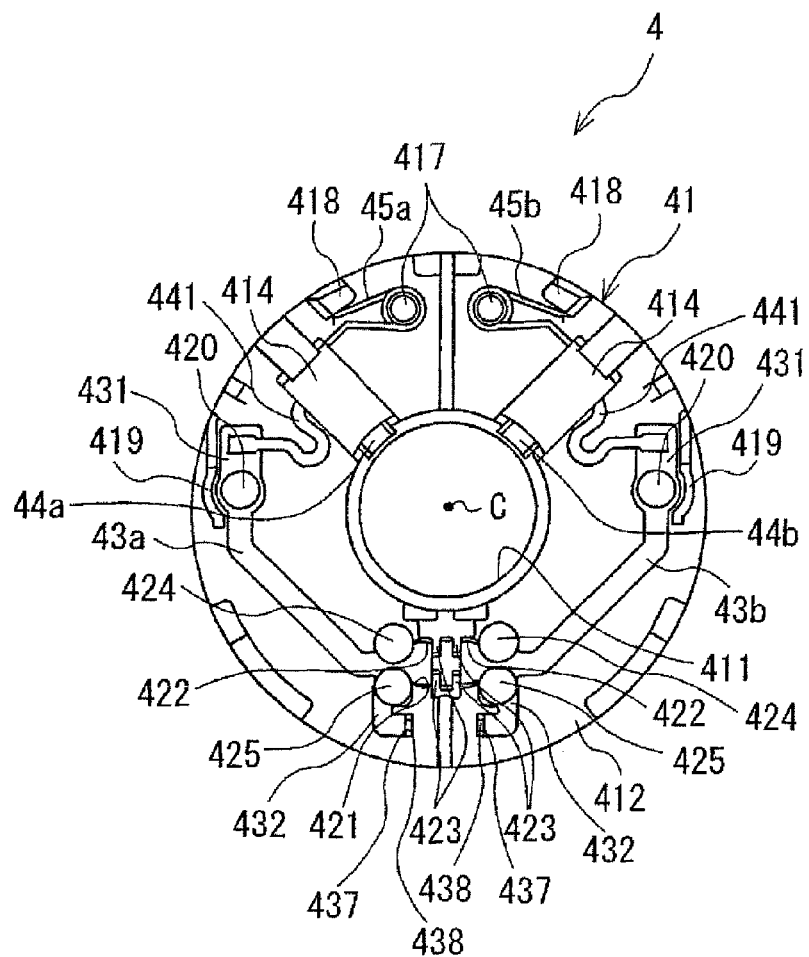
FIG. 4 is a plan view of an electricity supply unit according to the first embodiment.

As illustrated in FIG. 4, when the electricity supply unit 4 is completed, the brushes 44a and 44b are accommodated within the respective case portions 414 of the brush holder 41 while allowing the brushes 44a and 44b to be slidably movable. Coil springs 45a and 45b are attached to the respective holding shafts 417. One end portion of each of the coil springs 45a and 45b engages with the spring bearing portion 418. The other end portion of each of the coil springs 45a and 45b is inserted into the slit 416 of the case portion 414 and contacts an end portion of each of the brushes 44a and 44b (see FIG. 1). Accordingly, the brushes 44a and 44b receive the biasing force from the respective coil springs 45a and 45b and are pressed in the radially inward direction, so that the brushes 44a and 45b slidably contact each segment 36 of the commutator 35 while rotating.

The pair of electricity supply terminals 43a and 43b is mounted on the brush holder 41 in a manner that the brush-side fixing pillars 420 are inserted into the corresponding calking holes 434, the input-side fixing pillars 424 and 425 are inserted into the corresponding fixing holes 435 and 436, and the contact portions 433 are inserted into the corresponding insertion portions 422 of the terminal insertion bore 421. End portions of the brush-side fixing pillars 420 and the input-side fixing pillars 424, 425 piercing through the corresponding electricity supply terminals 43a and 43b are squashed by thermal caulking, whereby the electricity supply terminals 43a and 43b are fixed on the brush holder 41. In other words, the electricity supply terminals 43a and 43b are attached on the brush holder 41 by outsert molding.

The contact portions 433 of the respective pair of electricity supply terminals 43a and 43b inserted into the terminal insertion bore 421 are insulated from each other by the partition walls 423 provided within the terminal insertion bore 421. The contact portion 433 of each of the electricity supply terminals 43a and 43b is formed to be longer than the terminal holding portion 413 of the brush holder 41, therefore an end portion of the contact portion 433 inserted into the terminal insertion bore 421 projects from the corresponding terminal holding portion 413 (see FIG. 1).

Each of the brushes 44a and 44b is connected with a pigtail 441, which serves as a conductor. Each pigtail 441 is connected to the pigtail connecting portion 431 of each of the electricity supply terminals 43a and 43b by resistance welding.

The contact portions 433 of the respective electricity supply terminals 43a and 43b contact corresponding mating connector terminals (not shown), whereby a positive voltage is applied to one of the electricity supply terminals 43a and 43b, and a negative voltage is applied to the other one of the electricity supply terminals 43a and 43b, as a result, electricity is supplied to the brushes 44a and 44b.

The electricity supply unit 4 of this embodiment does not include the noise absorbing element, therefore no component is attached to the capacitance connecting portions 437 of the respective electricity supply terminals 43a and 43b.

In the above-explained electric motor 1, when a direct current is applied to the rotor coils 34 from the electricity supply terminals 43a and 43b via the corresponding brushes 44a and 44b, the rotor 3 rotates in one direction about the rotation axis C by the electromagnetic force generated between magnetic flux of the field poles 22a and 22b.

According to the first embodiment, because the pair of the input-side fixing pillars 424 and 425 and the corresponding brush-side fixing pillar 420 are spaced away from each other by the predetermined distance, the electricity supply terminals 43a and 43b, each of which is formed in one piece component, is attachable to the brush holder 41. Additionally, as will be explained in a second embodiment, a terminal structure, which differs from the above-mentioned electricity supply terminals 43a and 43b, and which includes a first terminal corresponding to one end of the terminal structure, a second terminal corresponding to the other end of the terminal structure, and the noise absorbing element connecting between the first terminal and the second terminal, is also attachable to the brush holder 41.

Accordingly, the brush holder 41 can be used both for the electric motor 1 with the noise absorbing element and the electric motor 1 without the noise absorbing element, therefore plural specific molds for manufacturing the brush holder 41 do not need to be prepared, and the layout of other components does not need to be changed regardless of whether the design with or without the noise absorbing element is adopted. As a result, the electric motor 1 may be downsized and may be manufactured with lower costs.

According to the first embodiment, because the electricity supply terminals 43a and 43b are fixed to the brush holder 41 by outsert molding, a mold for manufacturing the brush holder 41 does not need to be changed depending on the shape of the electricity supply terminals 43a and 43b to be attached to the brush holder 41 unlike when the electricity supply terminals 43a and 43b are fixed by insert molding. In other words, a single mold for the brush holder 41 can be used regardless of the shape of the electricity supply terminals 43a and 43b.

The capacitance connecting portions 437 serving as the attachment portions for the condenser, which connects the electricity supply terminals 43a and 43b, are formed at the current input-sides of the electricity supply terminals 43a and 43b, respectively. As a result, the condenser is attachable between the current input-sides of the respective electricity supply terminals 43a and 43b, whereby the electric motor 1 having the noise absorbing element can be easily realized.

Further, because the electricity supply terminals 43a and 43b extend in the radial direction of the rotation shaft 31 (i.e. a direction along the plan surface of the brush holder 41), the size of the electric motor 1 in the rotation axis direction may be reduced.

Second Embodiment

Figure 5:
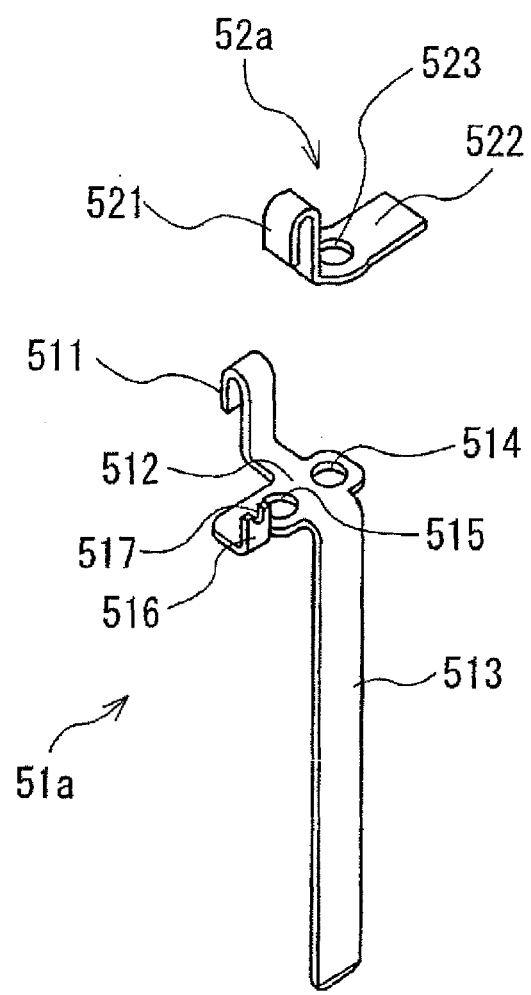
FIG. 5 is a perspective view of one of first terminals and a corresponding second terminal according to a second embodiment.

An electricity supply unit 5 according to the second embodiment of the present invention will be described below with reference to FIG. 5 to FIG. 7 focusing more on the differences between the first embodiment and the second embodiment. In the second embodiment, the electricity supply unit 5 includes choke coils 53a and 53b as the noise absorbing element. The brush holder 41 similar to the brush holder 41 of the first embodiment shown in FIG. 2 is also used in the second embodiment. Further, the electricity supply unit 5 is formed to be symmetric about the up-and-down direction in FIG. 6 as the center axis.

In the second embodiment, the terminal structure fixed on the brush holder 41 is configured with first terminals 51a and 51b, second terminals 52a and 52b, and the choke coils 53a and 53b. Each of the structure including the first terminal 51a, the second terminal 52a and the choke coil 53a arranged at the left side, and the structure including the first terminal 51b, the second terminal 52b and the choke coil 53b arranged at the right side corresponds to the second structure.

In the second embodiment, the pair of first terminals 51a and 51b is formed to be symmetric, and the pair of second terminals 52a and 52b are also formed to be symmetric (see FIG. 6), therefore only the first terminal 51a and the second terminal 52a arranged at the left side will be described below. The upper side in FIG. 5 is referred to as the upper side of the first terminal 51a and the second terminal 52a for convenience.

The first terminal 51a includes a coil connecting portion 511, an input-side fixing portion 512 connected to the coil connecting portion 511, and a contact portion 513. The contact portion 513 is similar to the contact portions 433 of the electricity supply terminals 43a and 43b of the first embodiment and more specifically, the contact portion 513 is connected to the input-side fixing portion 512 and extends in the vertical direction.

The coil connecting portion 511 upwardly extends and then is folded to curve, so that the coil connecting portion 511 has a hook shape having an opening, which opens in the downward direction. The input-side fixing portion 512 is formed in a flat plate shape, and is pierced by a pair of fixing holes 514 and 515.

As is the case with the electricity supply terminals 43a and 43b of the first embodiment, the input-side fixing portion 512 is integrally formed with a capacitance connecting portion 516 (which corresponds to the attachment portion for the condenser) in one piece. The capacitance connecting portion 516 is bent to be vertical relative to the input-side fixing portion 512, and is provided with a cut out 517 at a top portion thereof. The capacitance connecting portion 516 may be integrally formed with a pigtail connecting portion 522 of each of the second terminals 52a and 52b, which will be explained below, in one piece.

The second terminal 52a includes a coil connecting portion 521, which is similar to the coil connecting portion 511 of the first terminal 51a, and the pigtail connecting portion 522, which is connected to the coil connecting portion 521 and has a flat plate shape. A single caulking hole 523 pierces through the pigtail connecting portion 522. Additionally, an identical second terminal may be used both for the second terminal 52a arranged at the left side and the second terminal 52b arranged at the right side.

The pair of first terminals 51a and 51b is mounted on the brush holder 41 in such a manner that the input-side fixing pillars 424 and 425 are inserted into the respective fixing holes 514 and 515, and the contact portions 513 are inserted into the respective insertion portions 422 of the terminal insertion bore 421. As is the case with the electricity supply terminals 43a and 43b of the first embodiment, end portions of the input-side fixing pillars 424 and 425, which pierce through the respective first terminals 51a and 51b, are squashed by thermal caulking, whereby the first terminals 51a and 51b are fixed on the brush holder 41 (see FIG. 6).

The pair of second terminals 52a and 52b is mounted on the brush holder 41 in such a manner that the brush-side fixing pillars 420 are inserted into the corresponding caulking holes 523. End portions of the brush-side fixing pillars 420, which penetrate the respective second terminals 52a and 52b, are squashed by thermal caulking, whereby the second terminals 52a and 52b are fixed on the brush holder 41. In other words, the first terminals 51a, 51b and the second terminals 52a, 52b are attached on the brush holder 41 by outsert molding.

One end portion of each of the choke coils 53a and 53b is connected to the coil connecting portion 511 of each of the first terminals 51a and 51b, and the other end portion of each of the choke coils 53a and 53b is connected to the coil connecting portion 521 of each of the second terminals 52a and 52b. The choke coils 53a and 53b serve as the noise absorbing elements provided to the electric motor 1 in order to reduce noise generated by the electric motor 1. As illustrated in FIG. 7, each end portion of the choke coils 53a and 53b are connected to each of the first terminals 51a, 51b and each of the second terminals 52a, 52b in such a manner that each end portion of each of the choke coils 53a and 53b is held by each of the coil connecting portions 511 and 521, and each of the coil connecting portions 511 and 521 are crimped and welded to themselves (by means of fusing).

Figure 6:
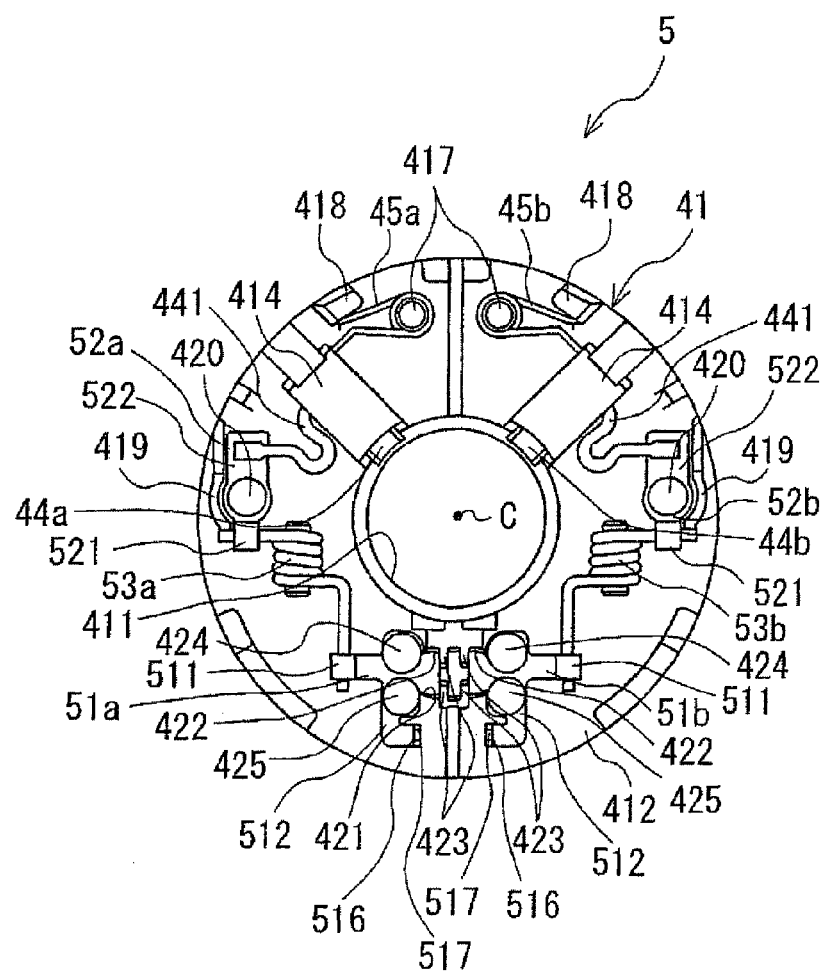
FIG. 6 is a plan view of an electricity supply unit according to the second embodiment.
Figure 7:
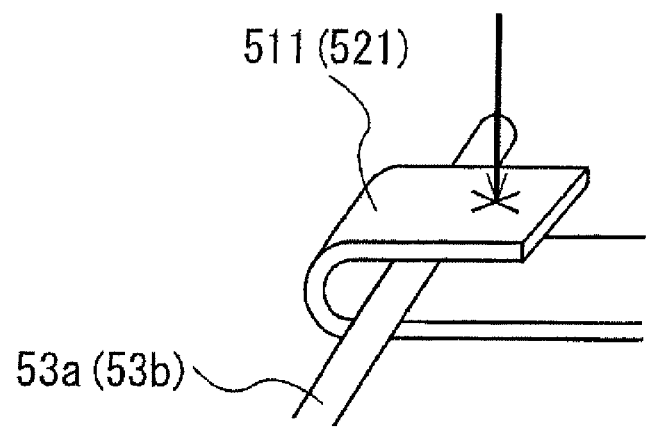
FIG. 7 is a perspective view showing a method of connecting a choke coil with a terminal by fusing.

As shown in FIG. 6, the choke coils 53a and 53b are fixed on the brush holder 41 in such a state that an axis of a helical portion of each of the choke coils 53a and 53b extends in the radial direction of the rotation shaft 31 (i.e. the direction extending along the plan surface of the brush holder 41), and each of the choke coils 53a and 53b connects each of the first terminals 51a, 51b with each of the second terminals 52a, 52b.

The pigtail 441 of each of the brushes 44a and 44b is connected to the pigtail connecting portion 522 of each of the second terminals 52a and 52b by resistance welding. The other configuration of the electricity supply unit 5 in this embodiment is similar to the electricity supply unit 4 in the first embodiment, therefore further explanation is omitted.

In addition, even in the electricity supply unit 5 of the second embodiment, the noise absorbing element is not attached to the capacitance connecting portion 516 of each of the first terminals 51a and 51b.

According to the second embodiment, because the axis of the helical portion of each of the choke coils 53a and 53b, each of which connects each of the first terminals 51a and 51b with each of the second terminals 52a and 52b, extends in the radial direction of the rotation shaft 31 (i.e. in the direction along the plan surface of the brush holder 41), the size of the electric motor 1 in the rotation axis direction may be reduced.

Furthermore, because the first terminals 51a, 51b and the second terminals 52a, 52b also extend in the radial direction of the rotation shaft 31 (i.e. in a direction where the brush holder 41 expands), the size of the electric motor 1 in the rotation axis direction may be further reduced.

Third Embodiment

An electricity supply unit 6 according to a third embodiment of the present invention will be explained below with reference to FIG. 8 focusing on the differences between the electricity supply unit 5 of the second embodiment and the electricity supply unit 6 of the third embodiment. In the third embodiment, the electricity supply unit 6 includes a ceramic condenser 61 as the noise absorbing element in addition to the choke coils 53a and 53b. Even in the third embodiment, the brush holder 41, the first terminals 51a and 51b, and the second terminals 52a and 52b, which are similar to those of the second embodiment illustrated in FIG. 6, are used. The electricity supply unit 6 is formed to be symmetric about the up-and-down direction in FIG. 8 as the center axis.

Figure 8:
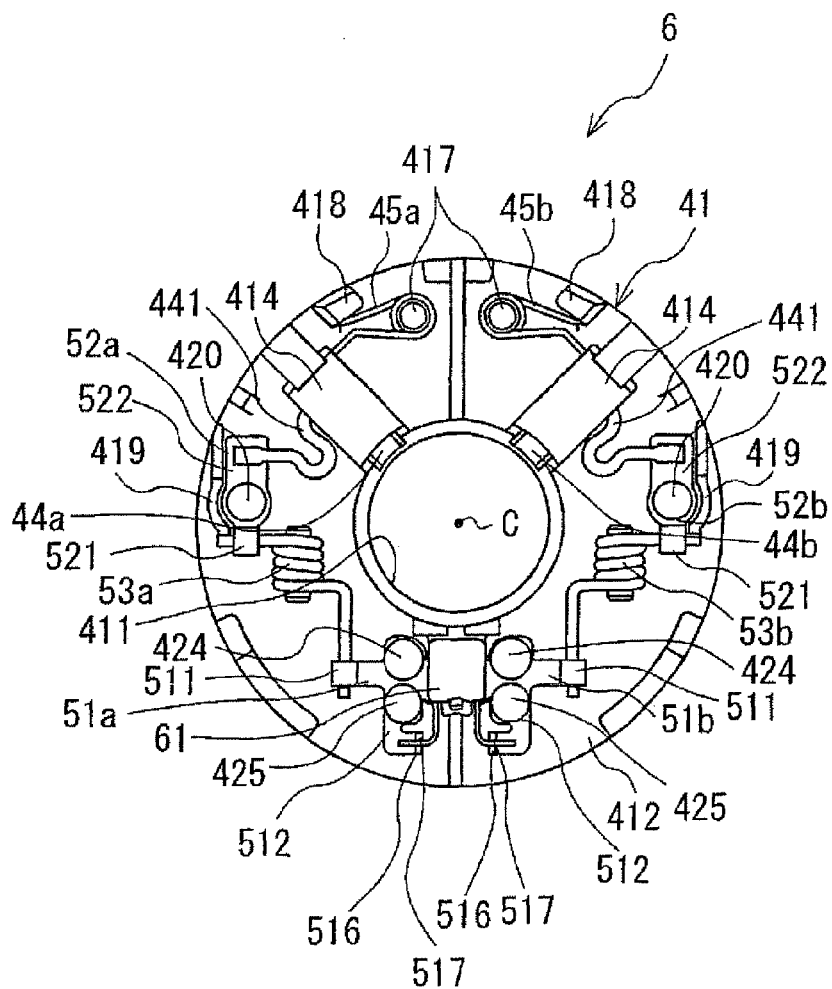
FIG. 8 is a plan view of an electricity supply unit according to a third embodiment.

As illustrated in FIG. 8, according to the electricity supply unit 6 of the third embodiment, the ceramic condenser 61 is connected between the capacitance connecting portions 516 of the respective first terminals 51a and 51b, which are arranged at the right and left sides, respectively. The ceramic condenser 61 serves as the noise absorbing element provided to the electric motor 1 in order to reduce noise thereof, and is connected between the first terminals 51a and 51b in such a manner that each terminal of the ceramic condenser 61 is inserted into each cut out 517 of each capacitance connecting portion 516 and is soldered.

Other configuration of the electricity supply unit 6 of the third embodiment is similar to the electricity supply unit 5 of the second embodiment, therefore further explanation is omitted.

According to the third embodiment, the ceramic condenser 61, which serves as the noise absorbing element connecting the first terminals 51a and 51b, is provided, whereby the electric motor 1 having a greater noise reduction effect may be achieved by the ceramic condenser 61 in addition to the choke coils 53a and 53b, each of which is connected between each of the first terminals 51a, 51b and each of the second terminals 52a, 52b.

Fourth Embodiment

First terminals 71a and 71b, second terminals 72a and 72b, and choke coils 73 according to a fourth embodiment of the present invention will be explained below with reference to FIG. 9 focusing on the differences from the second embodiment. Even in this embodiment, the first terminals 71a, 71b and the second terminals 72a, 72b are fixed on the brush holder 41, which is similar to the brush holder 41 of the second embodiment shown in FIG. 6.

Figure 9:
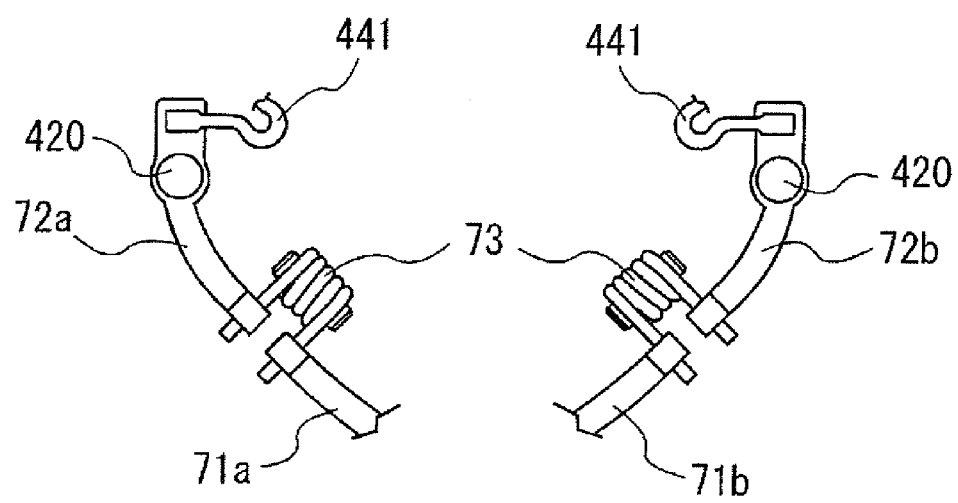
FIG. 9 is a partial view illustrating structure of first terminals, second terminals and choke coils, which are arranged at the left and right respectively, according to a fourth embodiment.

As illustrated in FIG. 9, in this embodiment, as is the case with the electricity supply unit 5 of the second embodiment, the first terminals 71a and 71b, which are arranged at the left and right sides, respectively, are formed to be symmetric about the up-and-down direction in FIG. 9 as the center axis, and the second terminals 72a and 72b, which are arranged at the left and right sides, respectively, are also formed to be symmetric. Accordingly, the identical choke coil may be used as the choke coil 73 connecting the first terminal 71a with the second terminal 72a, which are arranged at the left side, and the choke coil 73 connecting the first terminal 71b with the second terminal 72b, which are arranged at the right side. The configuration including the first terminal 71a, the second terminals 72a and the choke coil 73, which are arranged at the left side, corresponds to the second structure, and similarly, the configuration including the first terminal 71b, the second terminal 72b and the choke coil 73, which are arranged at the right side, corresponds to the second structure.

According to the fourth embodiment, the pair of first terminals 71a and 71b has a symmetric shape, and further, the pair of second terminals 72a and 72b has a symmetric shape, whereby the identical choke coils 73 may be used both as the choke coil 73 connecting the first terminal 71a with the second terminals 72a and the choke coil 73 connecting the first terminal 71b with the second terminal 72b.

Other Embodiment

The invention is not limited to the above-described embodiments, and the invention may be changed or modified as follows.

The number of field poles of the stator 2 and the number of the slots of the rotor 3 of the present invention are not necessarily fixed. Further, the electric motor 1 according to the present invention is applicable to an electric motor and a generator.

The ceramic condenser 61 may be connected between the capacitance connecting portions 437 of the respective electricity supply terminals 43a and 43b, which are arranged at the left and right side respectively, in the first embodiment.

The brush holder 41 may be used for the case when the single electricity supply terminal is attached as one of the pair of terminal structures, and the case when the first terminal and the second terminals, which are connected to the choke coil, are attached as one of the pair of terminal structures. The other one of the terminal structures may be used specifically to attach the single electricity supply terminal or to attach the first terminal and the second terminal, which are connected to the choke coil.

According to a first aspect of the electric motor 1 of the embodiments, the pair of the input-side fixing pillars 424, 425 and the corresponding brush-side fixing pillar 420 are spaced away from each other by the predetermined distance, and the brush holder 41 is formed so as to be usable both in the case that each of the electricity supply terminals 43a and 43b is formed as the continuous first structure attached to the brush holder 41 by the input-side fixing pillars 424, 425 and the brush-side fixing pillar 420, and in the case that the terminal structure is formed with the first terminal 51a, 51b, 71a, 71b attached to the brush holder 41 by the input-side fixing pillars 424 and 425, the second terminal 52a, 52b, 72a, 72b attached to the brush holder 41 by the brush-side fixing pillar 420, and the noise absorbing element 53a, 53b, 73, 61 connected between the first terminal 51a, 51b, 71a, 71b and the second terminal 52a, 52b, 72a, 72b. A terminal holding portion 413 holding the terminal structure 43a, 43b extends in a rotation axis direction of the rotor shaft from an element attachment portion 412 on which the first fixing portion 424 and the second fixing portion 420 are formed.

According to the first aspect of the embodiments, the brush holder 41 may be used both for the electric motor 1 having the noise absorbing element (53a, 53b, 73, 61) and for the electric motor 1 not having the noise absorbing element (53a, 53b, 73, 61). Therefore, plural specific molds for manufacturing the brush holder 41 do not need to be prepared, and the layout of other components does not need to be changed depending on the design with or without the noise absorbing element (53a, 53b, 73, 61). As a result, the electric motor 1 may be realized in a smaller size and with a lower manufacturing cost.

According to a second aspect of the embodiments, the capacitance connecting portion (437, 516) for the condenser 61 connecting the terminal structures (43a, 43b: 51a, 51b: 52a, 52b: 71a, 71b: 72a, 72b) is formed at each of the pair of terminal structures (43a, 43b: 51a, 51b: 52a, 52b: 71a, 71b: 72a, 72b). Accordingly, because each of the pair of terminal structures (43a, 43b: 51a, 51b: 52a, 52b: 71a, 71b: 72a, 72b) is formed with the capacitance connecting portion (437, 516) for the condenser 61 that connects the terminal structures (43a, 43b: 51a, 51b: 52a, 52b: 71a, 71b: 72a, 72b), the condenser 61 is attachable between the terminal structures (43a, 43b: 51a, 51b: 52a, 52b: 71a, 71b: 72a, 72b), and therefore, the electric motor 1 having the noise absorbing element (53a, 53b, 73, 61) may easily be formed. Further, in addition to the choke coil (53a, 53b, 73) connected between the first terminal (51a, 51b, 71a, 71b), which is attached by the input-side fixing pillars 424 and 425, and the second terminal (52a, 52b, 72a, 72b), which is attached by the brush-side fixing pillar 420, the ceramic condenser 61 may be attached either between the first terminals (51a, 51b: 71a, 71b) or between the second terminals (52a, 52b: 72a, 72b), whereby the electric motor 1 having a greater noise reduction effect may be realized.

According to a third aspect of the embodiments, the brush holder 41 extends in the radial direction of the rotation shaft 31, at least the one of the terminal structures (51a, 51b, 71a, 71b, 52a, 52b, 72a, 72b) is formed with the first terminal (51a, 51b, 71a, 71b), the second terminal (52a, 52b, 72a, 72b), and the choke coil (53a, 53b, 73) connected between the first terminal (51a, 51b, 71a, 71b) and the second terminal (52a, 52b, 72a, 72b), and the axis of the choke coil (53a, 53b, 73) extends in the radial direction of the rotation shaft 31.

Accordingly, because the axis of the choke coil (53a, 53b, 73) connecting the first terminal (51, 51b, 71a, 71b) with the second terminal (52a, 52b, 72a, 72b) extends in the radial direction of the rotation shaft 31, the size of the electric motor 1 in the rotation axis direction may be reduced.

According to a fourth aspect of the embodiments, each of the pair of terminal structures (51a, 51b, 52a, 52b, 71a, 71b, 72a, 72b) is formed with the first terminal (51a, 51b, 71a, 71b), the second terminal (52a, 52b, 72a, 72b) and the choke coil (53a, 53b, 73), the pair of first terminals (51a, 51b: 71a, 71b) has a symmetric shape, and the pair of second terminals (52a, 52b: 72a, 72b) has a symmetric shape.

Accordingly, because the pair of first terminals (51a, 51b: 71a, 71b) has the symmetric shape, and also the pair of second terminals (52a, 52b: 72a, 72b) has the symmetric shape, a single choke coil may be used as the choke coils (53a, 53b, 73) connected between the first terminals (51a, 51b, 71a, 71b) and the second terminals (52a, 52b, 72a, 72b), respectively.

The invention claimed is:

1. A rotating electrical machine comprising:
a housing whose one end opens;
a brush holder attached on the housing so as to close an opening of the housing;
a rotor shaft attached so as to be rotatable relative to the housing and the brush holder;
a commutator provided on an outer circumferential surface of the rotor shaft;
a pair of brushes attached on the brush holder while allowing the brushes to slidably contact the commutator; and
a pair of terminal structures, each of the terminal structures including one end portion mounted and fixed on the brush holder and another end portion connected to the corresponding brush with a pigtail, the pair of terminals supplying electricity to the brushes when an electric current is input thereto,
wherein each of the terminal structures is formed as a one piece structure so that the one end portion and the other end portion are continuously connected with each other,
wherein the brush holder is formed with
a pair of first fixing pillars, each first fixing pillar fixing the one end portion of the corresponding terminal structure, and a pair of second fixing pillars, each second fixing pillar fixing the other end portion of the corresponding terminal structure, where each of the pair of first fixing pillars are spaced away from each of the corresponding second fixing pillars by a predetermined distance, and
a terminal holding portion holding the terminal structure that extends in a rotation axis direction of the rotor shaft from an element attachment portion on which the pair of first fixing pillars and the pair of second fixing pillars are formed,
wherein the one end portion of each of the terminal structures comprises a first fixing hole and the other end portion of each of the terminal structure comprises a second fixing hole,
wherein each of the pair of first fixing pillars is inserted into the corresponding first fixing hole and each of the pair of second fixing pillars is inserted into the corresponding second fixing hole, and
wherein the one end portion of each of the terminal structures is fixed to the first fixing pillar by thermal caulking and the other end portion of each of the terminal structures is fixed to the second fixing pillar by thermal caulking so as to fix the terminal structure to the brush holder.

2. The rotating electrical machine according to claim 1, wherein an attachment portion for a condenser connecting the terminal structures is formed at each of the pair of terminal structures.

* * * * *